United States Patent Office 3,443,472
Patented May 13, 1969

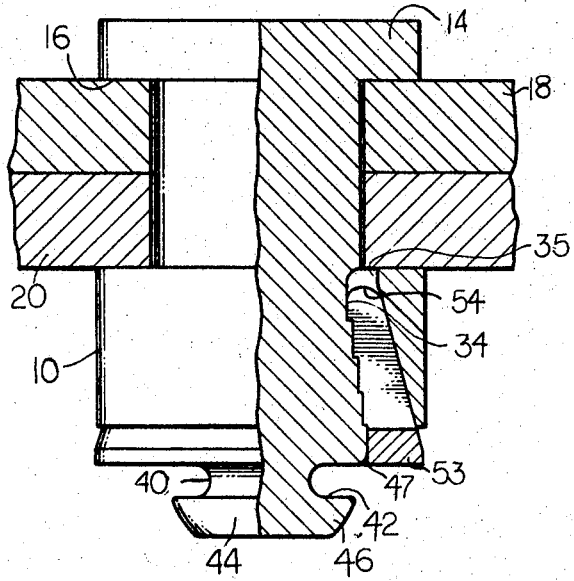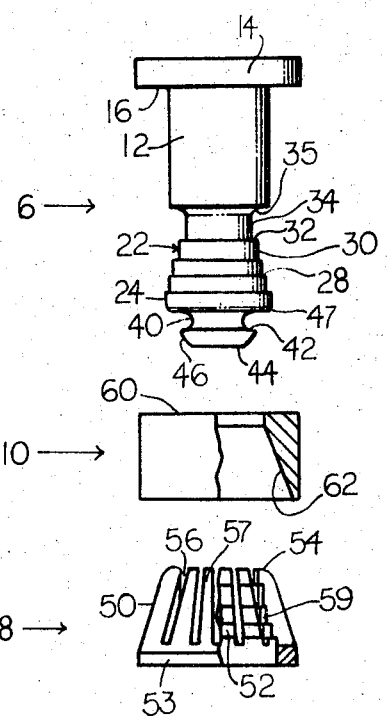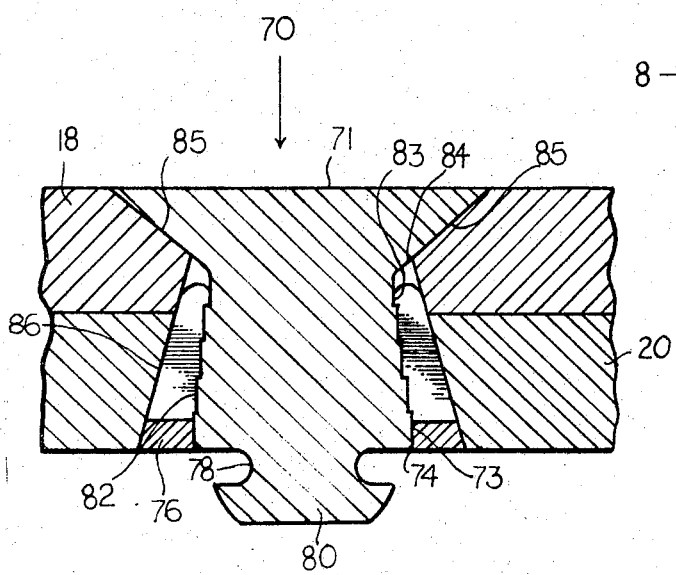

3,443,472
THREADLESS FASTENER APPARATUS
Joseph Darr, Jr., Apt. 229, Brazos Villa, Mineral Wells, Tex. 76067, and Ralph E. Cissell, 46817 N. 70th St. E., Lancaster, Calif. 93534
Filed Nov. 24, 1967, Ser. No. 685,463
Int. Cl. F16b *19/00, 21/00;* A44b *17/00*
U.S. Cl. 85—7         10 Claims

ABSTRACT OF THE DISCLOSURE

A non-separable, self-locking fastener for connecting a plurality of apertured articles is disclosed, including a bolt having a head and a shank including a stepped ridged lock engaging section. A resilient and expansible lock member which interfits a frusto-conical ridged lock section of the bolt, is expanded and axially inserted onto the bolt into non-releasable engagement with the interfitting lock section without deformation of either member. The exterior of the lock member tapers toward the bolt head and cooperates with a similarly shaped retaining member, which applies compressive forces to the lock member in response to axial loading forces on the bolt to oppose expansion and to prevent release of the lock member. The bolt may further include a puller knob on a tensilely frangible extension.

ORIGIN OF INVENTION

The invention described herein was made by employees of the United States Government and may be manufactured and used by or for the Government for governmental purposes without the payment of any royalties hereon or therefor.

BACKGROUND OF THE INVENTION

Field of the invention

The present invention relates to a self-locking fastener for connecting a plurality of articles and, more particularly, to a non-separable, non-deformable, threadless fastener apparatus.

Description of the prior art

There are many known devices both threaded and threadless, for accomplishing a fastening operation. Bolt and nut type threaded fasteners cannot readily be assembled in a blind position, since either the head end of the bolt or the nut must be gripped while the other is rotated to advance the assembly to a fastened condition. Even when tightly fastened, these fasteners are liable to loosen by vibration. Furthermore, without the use of special torque wrenches, the exact degree of tightening force is not known and may be insufficient and permit vibration and fatigue, or, it the torque is excessive, there is danger that the head of the bolt may be sheared off.

Other fasteners, such as rivets, require a material upset beyond the elastic limits of the head or the collar to form retaining grooves or edges by deformation or swaging. This may require a series of energetic blows to the collar or head and may be attended by considerable shock to the structure being assembled.

It is, therefore, an object of this invention to provide a fastener which is simple to assemble and requires minimum installation equipment.

It is a further object of this invention to provide a fastener device, the matings part of which are securely locked together and resist separation due to vibration, when once assembled.

Yet another object of this invention is a provision of a fastening device which is assembled into a self-locked condition without exceeding the elastic limits of the components thereof, thus permitting the use of non-malleable materials in both ends of the fasteners.

A still further object of the invention is to provide a threadless fastener device which may be simply and manually installed into a partially blind aperture.

Yet another object of the invention is to provide a fastener that can be assembled to provide a double-flush surface connection with at least the tensile strength characteristics of comparable fasteners.

Other objects and many of the attendant advantages of this invention will become more readily appreciated as the description proceeds.

SUMMARY OF THE INVENTION

Briefly, the non-separable fastener of the invention includes a bolt having a head and a shank portion provided with a ridged lock member engaging section. Permanent fastening of articles containing a set of bolt receiving apertures in registration is accomplished by inserting the bolt through the apertures, and by axially sliding a resilient and expansible sleeve like lock member over the lock section of the bolt without exceeding the elastic limit of, or deforming the ridges of the lock member or the lock section of the bolt. The lock member is prevented from expanding when assembled, by a restraining member which applies compressive forces to the assembled lock member in a direction normal to the axis of the bolt if an attempt is made to separate the articles being joined. Fastening by a single operator may be made more convenient by providing a tensioning grip or puller knob member on an extension of the bolt shank. Preferably, this puller knob is made separable by forming a reduced diameter frangible breakneck section between the lock section and the puller knob.

BRIEF DESCRIPTION OF THE DRAWINGS

The invention is now described in more detail in connection with the accompanying drawings in which FIGURE 1 is a side view, partially in section of a first embodiment of the fastener of the invention assembled into a registered set of apertured articles;

FIGURE 2 is a cross-sectional view of an alternate embodiment of the invention; and FIGURE 3 is a front view, partially in section of the unassembled components of the fastener of FIGURE 1.

Referring now to FIGURE 1, the fastener of the invention is illustrated as fastening two articles 18 and 20 together. As shown in FIGURES 1 and 3, the fastener generally includes in cooperative combination a bolt 6, means in the form of an expansible resilient lock member 8 for the bolt and means in the form of a sleeve 10 for retaining the assembled lock member in position. The bolt 6 may be made of steel, and is provided with a shank having a smooth cylindrical section 12 and a cylindrical head 14. Head 14 has a shoulder 16 for engaging article 18.

The cylindrical section 12 of the shank may be made substantially the same length as that of the total thickness of the two articles 18 and 20 to be fastened together. Extending beyond this section 12 is a ridged locking section 22. The diameter of the largest ridge 24 in section 22 is made with an outside diameter small enough so that it can be inserted through the apertures in articles 18 and 20. When the bolt 6 is inserted into articles 18 and 20, the head 14 will engage one surface of article 18, while locking section 22 will extend beyond the opposite surface.

The locking ridges, as shown, are in the form of a series of cylindrical segments of decreasing diameter, each having a horizontal edge 28 joining the vertical wall 30 of the succeeding ridge. They are illustrated forming a general frusto-conical locking section, the apex of which is on the longitudinal axial center line of the bolt directed toward the head-end thereof. Beyond the terminus of the last ledge 32 and wall 34 of the locking section 22 is a filet section 35. The diameter of the ridges can be made to correspond with the diameter of a comparable threaded fastener threaded section.

Beyond the locking section 22, the bolt is reduced in diameter to a breakneck groove 40 and then increases in diameter to form a shouldered gripping edge 42 and a grip-puller knob 44, which is larger in diameter than the breakneck section but is smaller in diameter than the diameter of the cylindrical shank section 12. The forward edge 46 of the puller knob 44 and of the largest locking ridge 47 are preferably rounded to receive the lock member 8 and spread it smoothly as will be explained below. The puller knob 44 is also constructed and designed to interengage and cooperate with a conventional installation tool, as, for example, shown in U.S. Patent 2,527,307, to Huck. The reduced diameter breakneck groove 40 facilitates removal of the protruding knob 44 after the fastener is fully engaged as will be explained later.

The lock member 8 is formed from a resilient material such as steel into a general frusto-conical shape having a smooth outer wall 50 and a ridged inner wall 52 that is complementary to the stepped ridges of the locking section 22 of the bolt. The forward edge 54 of the lock member may be made convex and rounded to facilitate insertion over the puller knob 44. It is preferred that the external wall 50 of lock member 8 taper relative to inner wall 52 with the result that the base wall thickness 53 is greater than the wall thickness at the head of the lock member. A greater component of the axial forces is transmitted in a direction normal to the lock member and compresses the partial locking fingers tighter against the bolt when the outer wall of the lock member has a large taper.

The wall of the lock member may be further modified by having a series of lateral slots 56 formed therein dividing the wall into a plurality of resilient segments 57 which are more easily expanded and have a spring like action urging a close fit with the ridged-locking section 22 of the bolt. The inner cone angles and diameters of the cylindrical ridges 59 on the interior surface of the lock member 8 are complementary to those of the mating and interfitting ridges of the wall of the locking section 22 of the bolt.

Compressive forces are applied to the outer wall 50 of the lock member 8 by means of a retaining sleeve 10. It has an end surface 60 for engaging article 20. The sleeve 10 is in the form of a cylinder having an internal wall 62 in the form of a truncated cone having a cone angle complementary with that of the external wall 50 of the lock 8. The sleeve 10 may be made of such length that it is co-extensive with a major portion of the outside surface of the lock member 8.

To assemble articles 18, 20, the bolt is inserted into the registered apertures and the retaining sleeve 10 is slipped onto the shank with the apex of the cone facing the head 14 of the bolt 6. While forcing the head of the bolt toward the article or while tensioning the puller knob, the lock 8 is then manually or mechanically pressed into place interfitting the corresponding ridges of the bolt 6 by positioning the lock with the forward smaller end toward the head of the bolt and moving it over the rounded edge of the protruding knob 44 and spreading it over the largest diameter projection 24 and upward toward the bolt head. Simultaneously, the outer conical surface 50 of the lock member 8 will be forced into engagement with the interfitting inside surface of the retaining sleeve 10. By further increasing the tensile force on the puller knob, it can be broken away at the breakneck groove.

It is apparent that the fastener cannot be separated without destruction of the retaining sleeve or the extreme deformation of the ridges on the lock and on the bolt, since tensile or compressive forces only tend to urge the assembly into tighter engagement. The fastener does not require safetying or vibration resistant appurtenances since, once assembled, the fastener is securely locked against vibration and removal by the cooperative engagement of the bolt, lock member and retaining sleeve. However, the strength characteristics are the full equivalent of conventional rivets and bolts in shear and under tensile loads. Furthermore, there is practically no strain on the lock since the internal diameter of the lock member is the same as the outside diameter of the locking section of the bolt. Since torquing is not required during assembly of the fastener, damaging the head or twisting it off are not problems. A special wrench for applying the exact amount of torque is not required nor need the head be prevented from rotation while the locking member is applied from the opposite side.

The head of the fastener of the invention is much stronger than a comparable rivet, since it does not have to be malleable. Yet it has at least the same tensile strength since it will have the same holding area. The impacting forces to deform or swage prior art locking members are eliminated, since the fastener is assembled by a simple expansion and insertion of the sleeve like lock member onto the ridged locking section of the bolt. With respect to partial blind fastening, the only requirement is that access must be had to the rear of the aperture to insert the bolt through the panel. In manual installation, the lock member can be inserted by any device that will advance the lock member into position relative to the bolt head.

A double flush surface connection can be effected with the fastener of the invention without compromise of strength characteristics as shown in FIGURE 2. In this embodiment, the bolt 70 does not have a cylindrical shank section but is provided with a conical head member 71 joining an axially extending ridged locking section 82. The largest diameter ridge 73 of the locking section 82 is rounded at 74 to permit smooth sliding insertion of the lock member 76 onto the bolt. The shank is then reduced in diameter to a breakneck groove 78 and then increased in diameter to the rounded puller knob 80.

The locking section of the bolt again includes a series of stepped cylindrical ridges 82 decreasing in diameter toward the head end of the bolt. At the juncture of the vertical wall 83 of the last ridge and the conical head, the shank has a concave rounded profile portion 84. The lock member 76 is identical to that described with respect to FIGURES 1 and 2.

Article 18, in this case, has a first conical recess 85. The conical angle of the bolt head 71 is made complementary to this recess. Article 20 has a second frusto-conical recess 86, and locking member 76 is made with a cone angle coincident with the outer surface of recess 86.

Thus, the outer conical wall of the article surrounding the lock member performs the compressive function of retaining sleeve 10 in urging the lock member ridges against the ridged locking section of the bolt. Similar techniques as discussed above are used to affect the cooperative engagement of the lock member and the bolt. While the fastener is described as made of steel, it would be apparent to those skilled in the art that it can be formed out of a naturally resilient material such as a synthetic organic plastic, for example, tetrafluorethylene. In this case, expansion slots 56 would not be necessary, since the lock member may be expanded to engage the locking section without exceeding its elastic limit.

It is to be understood that the foregoing only relates to the disclosure of preferred embodiments of the invention, and that numerous alterations, substitutions and modifications are all permissible without departing from the scope of the invention.

We claim:

1. A non-separable fastener for securing a series of articles comprising:
   a bolt member having a head and a shank including a lock engaging section, said section comprising a series of stepped cylindrical segments decreasing in diameter toward the head end of the bolt;

a resilient and expandable lock means the inner surface of which includes a series of stepped cylindrical segments complementary to and interfitting the segments of said section for engaging said section without deformation of the lock or said section; and lock retaining means for applying compressive forces to the assembled lock means in a direction normal to the axis of the bolt to prevent said resilient lock means from expanding.

2. A fastener according to claim 1 in which the lock means contains a series of lateral slots forming a plurality of resilient bolt engaging fingers.

3. A fastener according to claim 1 wherein the lock means has an outer smooth surface wall of a general frusto-conical shape tapering toward said head.

4. A fastener according to claim 3 wherein the apex cone angle of the outer surface of the resilient lock means is greater than the apex cone angle of the interior surface thereof.

5. A fastener according to claim 1 wherein the lock retaining means comprises an inwardly converging conical recess provided in one of the articles to be secured and the outer surface of said resilient lock means interfits said recess so that forces applied by said articles prevent said lock means from again expanding.

6. A non-separable fastener for securing a series of articles having registered fastener receiving apertures comprising:

a metal bolt member including a head, a puller knob and an axially extending shank therebetween, said head having a diameter larger than the diameter of said apertures, said shank and puller knob having a diameter no larger than the diameter of said apertures and said shank includes a series of stepped cylindrical segments having parallel locking ridges decreasing in diameter toward said head;

a resilient metal lock member having an inner surface complementary to said locking ridges and expandable within its elastic limit so it is axially insertable into engagement with said ridges without deformation of said lock member or said bolt member and having an outer surface wall of a general frusto-conical shape tapering toward said head; and metal lock retaining means for applying compressive forces to the assembled lock means in a direction normal to the axis of the bolt to prevent said resilient lock from again expanding.

7. A fastener according to claim 6 in which a reduced diameter tensilely frangible breakneck groove is provided on said shank between said puller knob and said locking ridges.

8. A fastener according to claim 7 in which the outer edge of said puller knob is rounded.

9. A fastener according to claim 6 in which said lock retaining means includes a first surface for engaging a surface of one of said articles opposite said bolt head and an inner conical recess complementary to the outer surface wall of said lock member.

10. A non-separable fastener for securing a plurality of apertured articles comprising:

a bolt member having a head, a shank including a lock engaging section comprising a series of stepped cylindrical segments decreasing in diameter toward said head and a puller knob on said shank separated from said lock engaging section by a reduced diameter frangible breakneck groove;

a resilient lock means expandable within its elastic limit to permit passage over said puller knob and said lock engaging section and operable to engage said section when contracted, said lock means engaging said section without deformation of the lock or said section and having an outer wall of frusto-conical shape tapering toward said head and an inner surface complementary to and interfitting the tapered cylindrical steps of said lock section of said bolt; and lock retaining means having an inner conical surface complementary to the outer wall surface of said lock means for engaging said lock to prevent said lock from again expanding.

References Cited

UNITED STATES PATENTS

| 951,593 | 3/1910 | Clarke | 85—33 |
|---|---|---|---|
| 1,613,654 | 1/1927 | Griffith | 24—217 |
| 2,505,915 | 5/1950 | Salmi | 85—5 |
| 3,238,835 | 3/1966 | Rosenberg | 85—7 |

CARL W. TOMLIN, *Primary Examiner.*

RAMON S. BRITTS, *Assistant Examiner.*

U.S. Cl. X.R.

24—217